US005079691A

United States Patent [19]

Heck et al.

[11] Patent Number: 5,079,691

[45] Date of Patent: Jan. 7, 1992

[54] CONTROL PROCESS AND APPARATUS, IN PARTICULAR LAMBDA CONTROL

[75] Inventors: Klaus Heck, Hohenacker; Günther Plapp, Filderstadt; Jürgen Kurle, Reutlingen, all of Fed. Rep. of Germany

[73] Assignee: Robert Bosch GmbH, Stuttgart, Fed. Rep. of Germany

[21] Appl. No.: 459,735

[22] PCT Filed: May 10, 1989

[86] PCT No.: PCT/DE89/00291

§ 371 Date: Jan. 16, 1990

§ 102(e) Date: Jan. 16, 1990

[87] PCT Pub. No.: WO89/11032

PCT Pub. Date: Nov. 16, 1989

[30] Foreign Application Priority Data

May 14, 1988 [DE] Fed. Rep. of Germany ....... 3816520

[51] Int. Cl.$^5$ .............................................. G05B 13/02

[52] U.S. Cl. .............................. 364/165; 364/431.05; 123/480

[58] Field of Search ........... 364/164, 165, 166, 431.05, 364/160, 161, 162, 163, 148; 123/480, 488, 489, 494

[56] References Cited

U.S. PATENT DOCUMENTS 4,354,238 10/1982 Manaka et al. ................ 364/431.05

4,601,276 7/1986 Damson et al. .................... 123/494

4,631,687 12/1986 Kowalski et al. .................. 364/502

4,676,215 6/1987 Blocher et al. .................... 123/489

*Primary Examiner*—Jerry Smith

*Assistant Examiner*—Paul Gordon

*Attorney, Agent, or Firm*—Walter Ottesen

[57] ABSTRACT

A method for the adaptation of a precontrolled value for a feedback control is based on the realization that, whenever the operating conditions coincide with the calibration conditions for the initial determining of precontrolled values, no control-manipulated variable deviations may occur in all the operating ranges, and that accordingly deviations which are nevertheless observed are a sign that the calibration conditions no longer exist. This may be caused by aging effects or by uncompensated disturbances. The method establishes the differences in control-manipulated variable deviations over different classes of an influencing variable. For each influencing variable class, a correction value is then determined such that, by means of the correction value, the error previously observed for the respective range is compensated during operation of the controlled system. The method makes possible an accurate adaptation range by range in an off-line method and is therefore suitable in particular for the precontrolling feedback control of the lambda value of an internal combustion engine. An apparatus for carrying out the method is also disclosed.

14 Claims, 7 Drawing Sheets

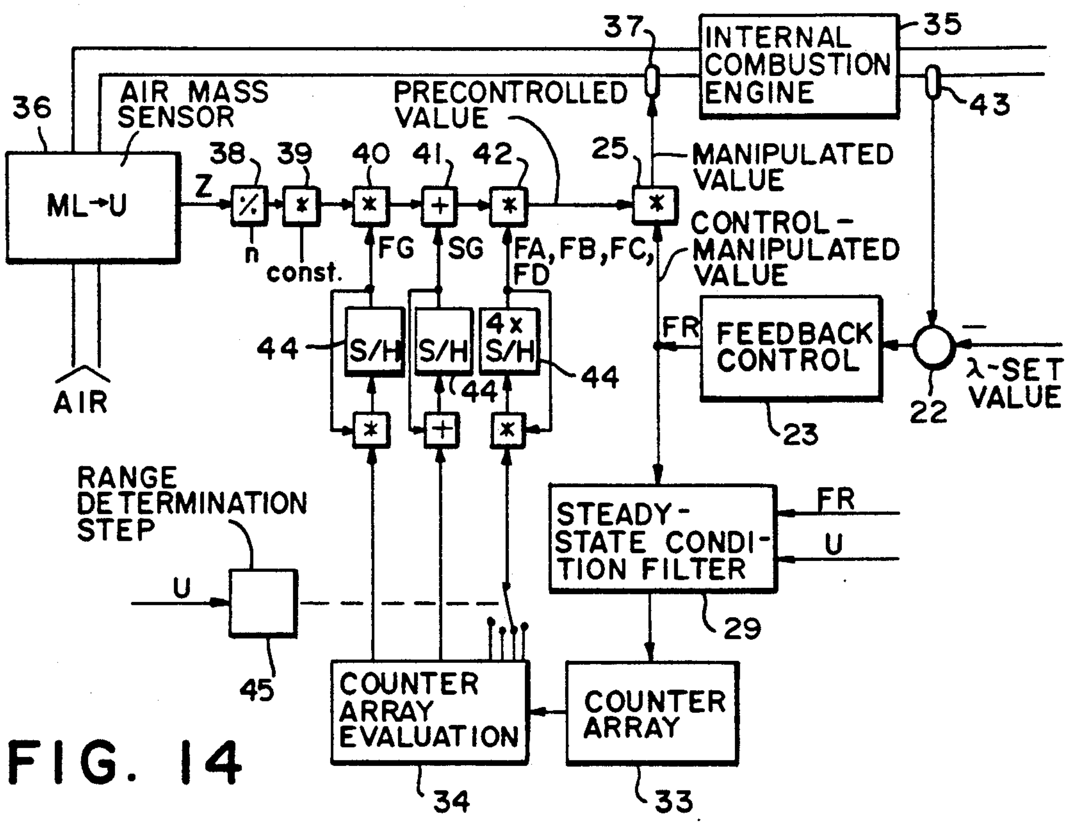
FIG. 14
FIG. 15
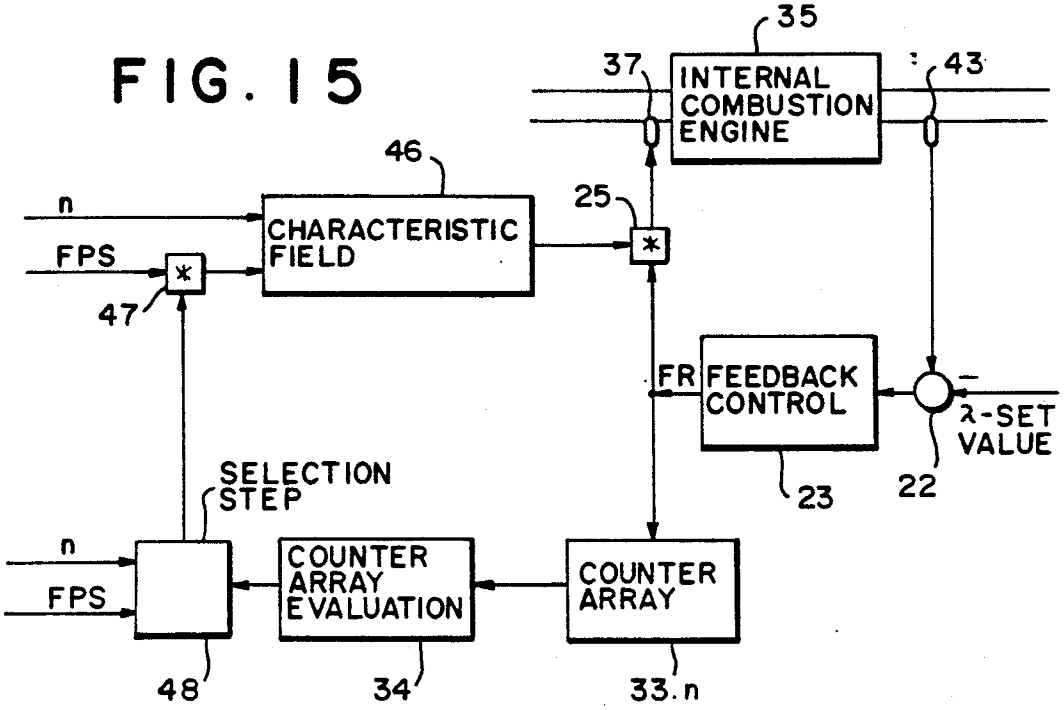

CONTROL PROCESS AND APPARATUS, IN PARTICULAR LAMBDA CONTROL

FIELD OF THE INVENTION

The invention relates to a method and an apparatus for precontrolling and feedback controlling a controlled variable, in particular the lambda value of the air/fuel mixture to be metered to an internal combustion engine.

BACKGROUND OF THE INVENTION

A method for precontrolling and feedback controlling a variable is known, for example from the controlling of the lambda value. For the explanation of such a method, let it first be assumed that the airstream fed to an internal combustion engine is constant. A quantity of fuel is fed which should lead to the lambda value 1. The maintaining of this desired value is monitored by a lambda sensor. If, on account of a change in the value of a disturbance, a deviation of the lambda actual value from the lambda set value occurs, the quantity of fuel metered is changed such that the lambda value 1 is restored. Then it is assumed that not only the value of a disturbance changes, but that also the air flow changes. This also leads to a change in the lambda actual value and consequently to a system deviation, which is compensated again by the control method. However, this correcting costs time. In order to shorten the time of a response to a change in the air flow, it is known to measure the respective air flow in a calibration process and to determine the associated value of the quantity of fuel which leads to the lambda value 1 when the calibration conditions exist. If then, in actual operation, the conditions deviate from the calibration conditions, only these relatively small deviations remain to be corrected, but no longer the large changes which are caused by arbitrary changing of the air flow.

In order to determine the correct precontrolled variable, in the case of the example, the air flow has to be measured. If, on account of aging effects, the initial value of the measuring device changes over the course of time with the same air flow, that is the same input value, the precontrolled value is incorrectly determined. This error too can be compensated by means of the feedback control, but with the already-mentioned disadvantage of the slow response in comparison with the precontrol. However, adaptation processes have already been developed in order to take into account, for example, such aging effects in the precontrol. In the case of the known adaptation methods, however, only a single adaptation value or a single set of adaptation values is determined for the entire measuring range. This leads to the corrected precontrol only operating accurately in the measuring range for which the adaptation value coincides with the deviation caused by aging. In order to achieve higher accuracy over the entire measuring range, it is known to use characteristic fields for the precontrol and associated adapted characteristic fields (U.S. Pat. No. 4,676,215). However, processes necessary for this involve very complex calculations, for which reason they are not feasible in the foreseeable future with the microcomputers usual in motor vehicle electronics.

The same also applies to precontrolling and feedback controlling a controlled variable on devices other than an internal combustion engine. The influencing variable need not necessarily be the air flow, it may, for example, also be the viscosity of the fluid to be delivered by a pump or the ventilation of the space to be kept at a certain temperature or any desired disturbance. The calibration need not necessarily be performed with the control-manipulated value maintained at 0, but this is of particular advantage since then use of the control is minimized in operation.

The invention is based on the object of specifying a method for precontrolling and feedback controlling a controlled variable, which compensates for effects caused by aging for each range by influencing the precontrolled variable. The invention is also based on the object of specifying an apparatus for carrying out such a method.

SUMMARY OF THE INVENTION

The method according to the invention is distinguished by the use of a counter array wherein only counter readings are incremented during the operation of the controlled system. However, the counter array is not evaluated continuously but only when an evaluation condition has arisen. The counter array is divided according to influencing variable classes and control-manipulated variable classes with a cell having a counter belonging to each combination of the two classes. For each value detection during operation, a test is conducted to determine in which influencing variable class the influencing variable happens to lie and in which control-manipulated variable class the control-manipulated value happens to lie and the counter of the associated cell is incremented. When the evaluation condition arises, the counter array is evaluated in such a way that the distribution over the control-manipulated variable class is established for each setting variable class and whenever the concentrations of distribution for different influencing variable classes lie in different control-manipulated variable classes, a correction value for the influencing variable class is computed. The manipulated values are influenced by the associated correction value, taking into account the relevant influencing variable class during the operation of the controlled system. The correction values are determined by the evaluation such that the concentrations of distribution for all influencing variable classes are to lie in the same control-manipulated variable class. If no further adaptation measures are taken, the correction values are determined such that the concentrations of distribution for all influencing variable classes are to lie at the control-manipulated value 0. It is of particular advantage to apply the method together with a relatively rapidly acting adaptation. This adaptation accepts all of the deviations which are manifested by a multiplicative and/or additive disturbance value which is the same for all influencing variable classes. The evaluation of the counter array then only serves for the structural adaptation, that is for the compensation of such errors which are individual to the influencing variable classes.

The apparatus according to the invention is distinguished in particular by the existence of a counter array of the above-described type and by means for evaluating the counter array.

BRIEF DESCRIPTION OF THE DRAWINGS

The invention is explained in more detail below with reference to exemplary embodiments illustrated by figures, wherein:

FIG. 14 shows a block circuit diagram directed to a method for lambda control with precontrol and adaptation of the output variable with the aid of a counter array;

FIG. 15 shows a block circuit diagram of a control loop with precontrol by a characteristic field and adaptive correction of an addressing variable of the field;

DESCRIPTION OF THE PREFERRED EMBODIMENTS OF THE INVENTION

Figure 1:
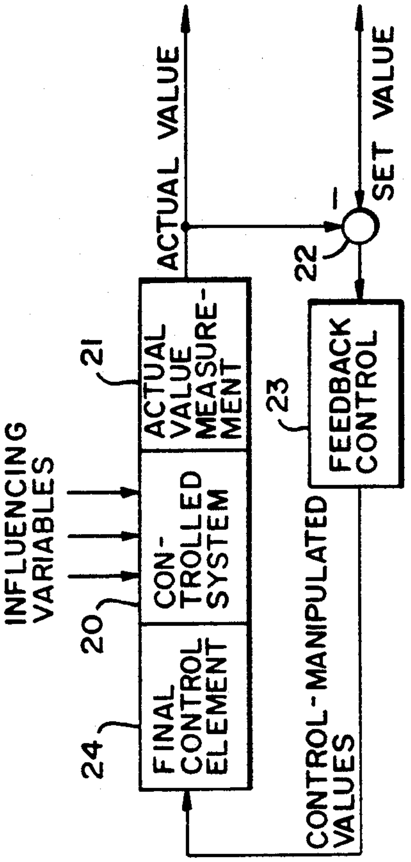
FIG. 1 shows a block circuit diagram of a conventional control loop.

First a number of terms will be explained with reference to the usual control loop according to FIG. 1. The control loop has a controlled system 20, at which the actual value of a controlled variable is measured by an actual value sensor 21. This value is fed to a comparison point 22 and subtracted there from a controlled-variable set value. The resulting system deviation is processed by a control device 23, for example a PI control device, to give a control-manipulated value. This value is computed such that it adjusts a final control element 24 on the controlled system 20 in such a way that conditions are established which adjust the actual value in the direction of the set value. The controlled system 20 may, for example, be a pump driven by an electric motor or an internal combustion engine. The set value is then, for example, the pump speed or the lambda value of the exhaust gas. The control device computes a current flow necessary for achieving the speed or a quantity of fuel necessary for achieving the predetermined lambda value. The final control element is consequently a current adjuster, for example a thyristor, or a fuel metering device, for example an injection valve arrangement.

If the set value, that is the speed or the lambda value, is changed suddenly, a system deviation occurs. The control device 23 then computes a new control-manipulated value, which leads to an actual value coinciding with the set value. It is important for understanding the following that the control-manipulated value consequently depends on the set value.

However, the control-manipulated value depends not only on the set value but also on the value of influencing variables which act on the controlled system 20. In the case of the example of the pump, this may be the viscosity of the fluid to be pumped, the voltage across the electric motor and the resistance of bearings. In the case of the internal combustion engine mentioned, the air volume, the air pressure and injection valve aging are examples of influencing variables. It is assumed, for example, that the viscosity of the fluid to be pumped increases. Then the pump has to deliver a greater output at the same speed, that is the control device 23 has to provide a higher current flow by changing the control-manipulated value. In other words, with a constant set value, the control-manipulated value has changed due to the changed value of an influencing variable. This relationship is also significant for understanding the following.

As is known, a certain period of time elapses before the actual value is again corrected to a state of equilibrium after changing of the set value or of an influencing value. In order to shorten this period, various measures are known, for example the introduction of a D component in the control-manipulated value or the precontrolling of the manipulated value. The manipulated value is then made up of a precontrolled value and a control-manipulated value. If, for example, in the case of the pump mentioned, the set value, that is the desired speed, ultimately the pumping volume, is increased, the response of the control device 23 to the system deviation occurring is not awaited in such a case, instead the manipulated value is increased directly together with the set value in such a way that the desired speed is established. The relationship between set values and manipulated values, which are necessary in order for the actual value to reach the set value, is established by calibration. In the case of the example of the internal combustion engine, the variable which leads to a direct change in the manipulated value by precontrol may be the airflow fed to the internal combustion engine.

Figure 2:
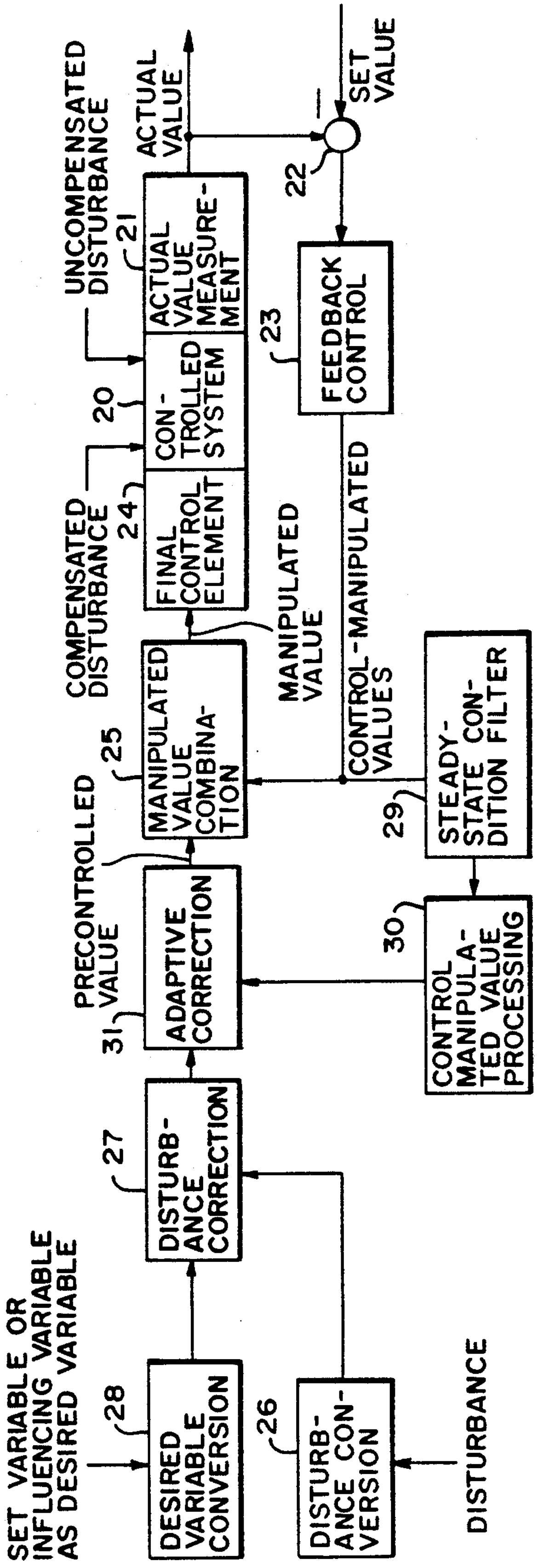
FIG. 2 shows a block circuit diagram of a control loop with precontrol and adaptation.

Details of a precontrol are explained with reference to FIG. 2. The embodiment according to FIG. 2 does not yet represent the invention, but points towards it by an overall view of measures known per se from the prior art. With reference to FIG. 2, it is to be explained in particular that the control-manipulated value behaves differently in the event of changes in influencing variables in the case of methods with precontrol than in the case of a feedback control, and that the behavior is altered still further if in addition an adaptation takes place.

The function sequence according to FIG. 2 also includes a controlled system 20, an actual value sensor 21, a comparison point 22, a control device 23 and a final control element 24. However, the control-manipulated value emitted by the control device 23 is no longer passed on directly to the final control element 24, but is used together with a precontrolled value to form, at a manipulated-value logic combination point 25, a manipulated value, which is then fed to the final control element 24. The precontrolled value results from a relatively complex process, which is only explained in principle however with reference to FIG. 2.

In FIG. 2, it is assumed that now only an uncompensated influencing variable is acting as disturbance on the controlled system 20. Only fluctuations in the disturbance values are still to be compensated by means of the control device 23. The influence of other disturbances or, for example, of the set value is assumed to be compensated by a precontrol. A sequence is drawn for a compensated disturbance. A disturbance input value is established and a disturbance output value is determined by a means 26 for disturbance conversion. The disturbance input value is, for example, the measured input voltage in the case of the pump, or the air pressure in the case of the internal combustion engine, and the disturbance output value is a current which is necessary for power compensation or a multiplication factor by which a precomputed injection time is corrected in order to compensate the change in air mass induced by a change in air pressure. The disturbance output value is introduced into the computation of the precontrolled value by a means 27 for disturbance correction. This means can, for example, add an additional current or multiply an injection-time correction factor.

As a further variable processed in the precontrolled value, a desired variable is represented in FIG. 2. In the case of the example of the pump, this may be the speed, that is the pumping volume, and in the case of the example of the internal combustion engine, the air volume taken in by suction. In the first case, the desired variable values thus correspond to set values, while in the second case they correspond to influencing variable values. The value of the desired variable is fed as input value to a means 28 for desired variable conversion, and the means 28 supplies an output value. The input value may be a voltage proportional to the set value and the output value may be a manipulated value for current control. In the case of the other example, the input value may be a voltage emitted by an air volume sensor and the output value a temporary injection time, for example expressed as counter value. In the means 27 for disturbance correction, the disturbance output value is combined with the output value.

In FIG. 2, a steady-state condition filter 29, a control-manipulated variable processor 30 and an adaption correction means 3 are also drawn in. The method steps executed by these means are initially to be ignored.

Under the condition just mentioned, the output value of the desired variable, corrected by the disturbance output value in the means 27 for disturbance correction, forms the precontrolled value, which is combined at the manipulated-value combination point 25 with the control-manipulated variable by the control device 23 to form the manipulated value fed to the final control element 24.

The calibration of the means 28 for desired variable conversion and of the means 26 for disturbance conversion will now be considered. In the calibration of the means 28 for desired variable conversion, the set value and all influencing variables apart from the desired variable are kept constant. Then the output value is determined for each input value of the desired variable such that the value of the control-manipulated variable becomes 0. If then, in the operation of the controlled system 20, the desired variable assumes a certain input value, the means 28 for desired variable conversion outputs the output value determined in the described calibration process, so that the control-manipulated value 0 should again be reached. Further below it will be discussed in which cases the value of the control-manipulated variable is not equal to 0. This is of decisive significance for the invention.

The calibration of the means 26 for disturbance conversion is carried out in a corresponding way to the calibration described above. The set value and all influencing variables, apart from the one disturbance which is converted, are kept constant. For each disturbance input value, that disturbance output value is determined which in combination with the existing output value leads to the control-manipulated value 0. Then, in the operation of the controlled system 20, every change in this compensated disturbance should be cancelled in its effect on the controlled system by the associated disturbance output value.

If no variables act on the controlled system 20 apart from those detected in the precontrol, there should be no deviation of the control-manipulated value from the value 0 if there is no change in these detected variables. However, the means 26 and 28 for the conversion of variables can age. Then, after a certain operating time, the relationship between input value and output value determined during calibration no longer applies, that is an output value is read out which does not lead to an actual value coinciding with the set value. That is, a value of the control-manipulated variable not equal to 1 is read out for a certain input value. The greater the aging error becomes, the greater the control-manipulated value becomes. If there are a plurality of converters, and each of these converters ages, the control-manipulated value deviating from 0 is made up of sub-values which are caused by aging errors of the various converters. In addition, the control-manipulated value is also influenced by uncompensated disturbances. If, in the case of the pump, for example the bearing resistance becomes greater, the speed actual value would drop with respect to the set value were it not for the control device 23, which in this case increases the control-manipulated value. In the case of the internal combustion engine, the valve aging, on account of which the valve opens more and more slowly, may be an uncompensated disturbance. The control device then has to provide for the same quantities of fuel in each case for a triggering time which becomes longer and longer.

To sum up the above, it may be stated that, in the case of a control loop, the values of the control-manipulated variable depend on the values of all the influencing variables and on the set value. In the case of a control process with precontrol, on the other hand, all the value changes of compensated variables, be they the set value or influencing variables, do not lead to a deviation of the control-manipulated variable from the value 0 as long as no aging effects occur. Changes in the control-manipulated value are thus only caused by aging effects and uncompensated disturbances.

If an adaptation is additionally provided by the adaptation measures 29, 30 and 31, control-manipulated values not equal to 0 only occur temporarily even if there are aging effects and the effect of uncompensated disturbances. This will now be explained.

In the case of adaptation methods, typically the control-manipulated variable is integrated by the already-mentioned control-manipulated variable processor 30. In order that the adaptation is not performed on the strength of control-manipulated values for special situations, the steady-state condition filter 29 is in various embodiments connected upstream of the control-manipulated value processor 30. The desired variable is fed to the filter, for example, and the filter only allows a control-manipulated value to pass to the control-manipulated variable processor 30 if the desired variable drops below a given rate of change. The adaptation value or typical set of adaptation values computed by the control-manipulated variable processor 30 is fed to the means for adaptive correction 31, which combines the adaptation value or the adaptation values with the above-mentioned precontrolled value to result in the precontrolled value applicable at that time.

It should be pointed out at this stage that the control-manipulated value associated with the system deviation 0 need not necessarily be 0, as previously assumed. This is expediently the case if the control-manipulated value is additively combined with the precontrolled value. The control-manipulated variable may, however, also be a control factor. In this case, the manipulated value associated with the system deviation 0 is the value 1. The above-mentioned calibration operations are performed in the direction of this control-manipulated value 1.

To illustrate the function of the adaptation, the internal combustion engine already referred to a number of times is taken as a starting point. Let the desired variable be the air volume and the compensated disturbance be the air pressure. It is assumed that the apparatus has been calibrated with certain injection valves. These original injection valves have now been replaced by new ones, which deliver 5% less fuel with the same manipulated value. In order to compensate this 5% fuel loss with the same precontrolled value, the control-manipulated value must rise from 1 to 1.05, in order to provide a manipulated value increased by 5% after multiplication by the precontrolled value. By means of the adaptation process, this control-manipulated value is integrated and the adaptation value thus formed is multiplied in the means 31 for adaptive correction by the disturbance-compensated output value. The integration is performed until the control-manipulated value again assumes the value 1. Then, the adaptation value is 1.05. The adaptation consequently has the advantage that even disturbances not picked up by measuring instruments are included in the precontrolled value, so that feedback control operations are restricted to a minimum.

It is problematical in adaptation that, as a rule, only a single adaptation value is determined for the entire working range of the controlled system 20, for example only a single multiplicative correction factor for all the speed and load ranges of an internal combustion engine. Up until now, this deficiency is countered by two methods. One is that a set of adaptation values is determined for effects of different character, for example an additive leakage air adaptation value, a multiplicative adaptation value and an injection-time additive adaptation value. The three values are combined in the order mentioned with the output value of the means 28 for desired variable conversion, the control factor being incorporated before the final additive operation. In this case as well, the set of three values applies for all speed and load ranges. In order to remedy this deficiency, the process explained in the specification mentioned at the beginning provides for adaptation values to be stored in a speed-dependent and load-dependent field and consequently to compensate output values which are read out from a second speed-dependent and load-dependent field. However, this latter method requires a lot of computations.

At this point it should be pointed out that complex control processes according to the prior art are performed by microcomputers. Accordingly, the various means for achieving interim results in the control process, such as have been explained with reference to FIGS. 1 and 2, are normally computation steps in a program. The manipulated values computed by the program have to be updated at intervals of a few milliseconds. As a consequence, complicated programs, such as for performing the method just mentioned, cannot in practice be carried out at reasonable cost according to the current state of the art. Large computers are necessary for this.

Let it be assumed for the further explanations that a control process with precontrol is carried out without adaptation. Let it also be assumed that there is no disturbance acting which has not already acted in calibration and that the calibrated measuring devices and conversion devices have not yet aged. Then the following considerations apply.

Let us assume a linear characteristic, for example of the means 28 for desired variable conversion. In the diagram according to FIG. 3, the input variable is plotted in arbitrary units on the abscissa, the output variable is plotted on the ordinate likewise in arbitrary units. Within a period of 0 to 100 units of the input variable, the output variable changes between the values 2 and 10 of the unit there. Let the input variable be, for example, the speed and, the output variable, a control voltage for a thyristor, or let the input variable be the voltage of an air mass sensor and the output variable a counter value for a counter for establishing the injection time. It is pointed out that, unlike in FIG. 3, in the case of the last example the relationship is not linear in reality. Then let the input variable be divided into four input variable classes, specifically the classes of 0–25, 25–50, 50–75 and 75–100 units. These classes are to serve for use in a counter array.

Figure 4:
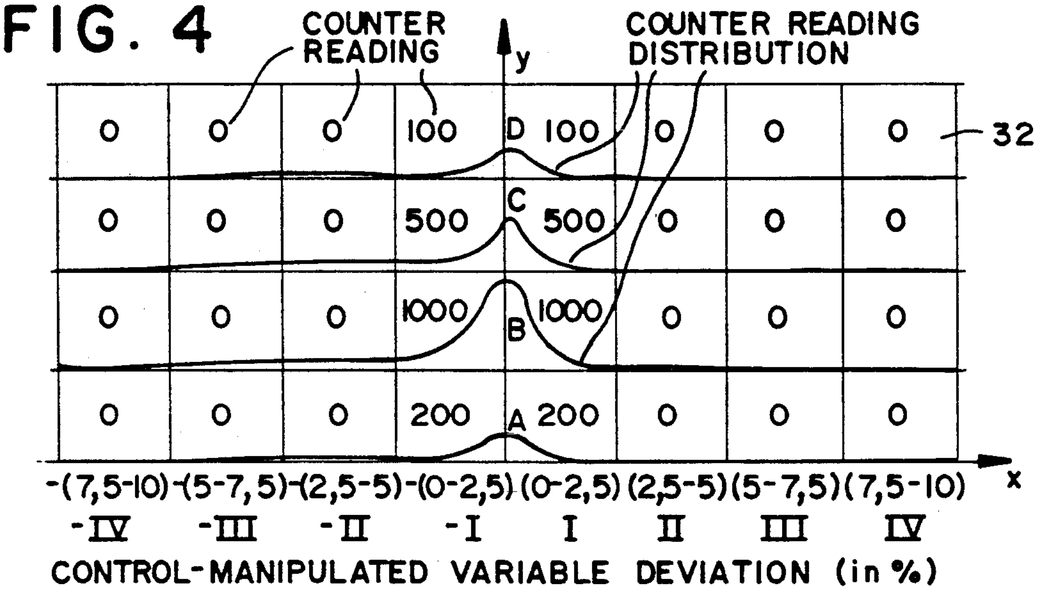
FIG. 4 shows a diagram for explaining the setup of a counter array.

An example of the counter array just mentioned is represented in FIG. 4. In this counter array, the four input variable classes lie one above the other, that is to say in y direction. In x direction, a total of eight control-manipulated variable classes lie next to one another, namely a class -IV for manipulated variable deviations of -(6%–8%), -III of -(4%–6%), -II of -(2%–4%), -I of -(0%–2%), I of 0–2.5%, II of 2.5%–5%, III of 5%–7.5% and IV of 7.5%–10%. On account of the overlaps between the four input variable classes and the eight control-manipulated variable classes, the array has a total of 32 cells. Each cell is assigned a counter, that is if the counter array is realized by a RAM, each RAM cell associated with the counter array can be incremented. The counter reading of each cell is set of "0" at the beginning of operation of the controlled system 20. After each triggering of the final control element 24, that is for example of an injection valve, it is checked in which input variable class and which control-manipulated variable class the system happens to be. In the assumed case that no unexpected values of disturbances occur and there are no aging effects, the manipulated variable deviation is ideally 0%, that is in practice it fluctuates slightly back and forth around this value, so that entries are only made in the control-manipulated variable classes I and -I. In the example of FIG. 4, it is assumed that 3600 measurements of the manipulated variable deviation have already been taken 400 counts are assumed to have occurred in the input variable class of 0–25 units, 2000 counts in the input variable class of 25–50 units, 1000 counts in the input variable class of 75–100 units. The counts are assumed to be evenly distributed over the control-manipulated variable classes I and -I, so that for example 1000 counts lie in the cell which is assigned to control-manipulated variable class I and the input variable class of 25–50 units. The counter readings are entered in the cells in the illustration according to FIG. 4. Also entered in each input variable class is a counter reading distribution in the form of a normal distribution. The maximum and also the concentration of each of these distributions coincides with the y axis, since the counter readings are symmetrical to this axis. The distribution maxima vary in height on account of the different counter readings mentioned.

The invention is based, inter alia, on the consideration that if manipulated variable deviations occur on account of an aging effect, the counter readings in input variable classes can no longer lie symmetrically to the y axis. The concentrations of normal distributions computed from the counter readings must be shifted with respect to the y axis.

This consideration is now explained with reference to FIGS. 5a, b to 8a, b.

Figure 3:
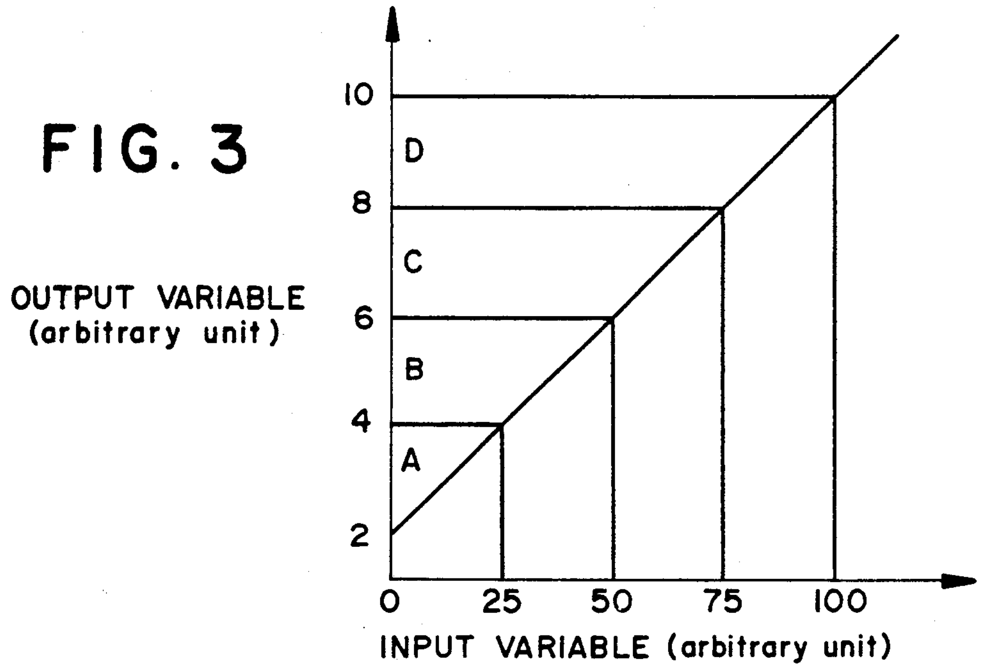
FIG. 3 shows a characteristic diagram for a measuring device.
Figure 5A:
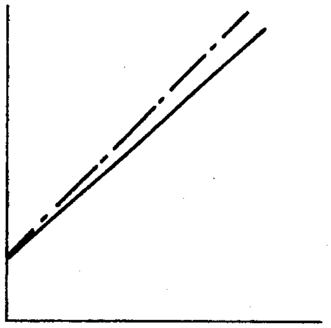
FIGS. 5*a, b* to 8*a, b* show diagrams corresponding to those of FIG. 3 and FIG. 4 for explaining the influence of different characteristic changes on the counting values in the counter array according to FIG. 4.
Figure 5B:
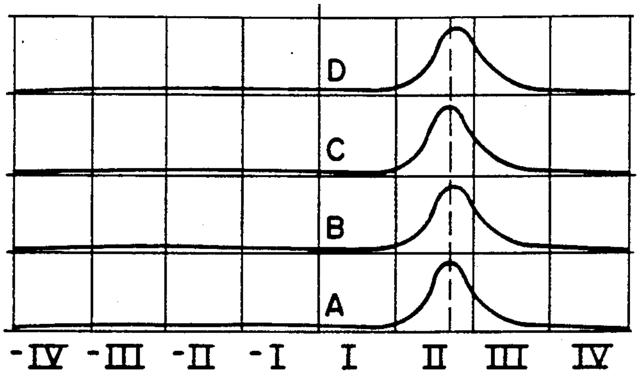

In the case of the diagrams according to FIGS. 5a and b, it is assumed that the characteristic according to FIG. 3 is an output variable reduced by aging by 4% over the entire range of the input variable. Thus, for example, instead of the end value "10", now 0.4 units less are indicated, that is "9.6". Since the error is in percentage equal over the entire range of the input variable, it acts equally in all four input variable classes. Let it be assumed that all the input variable classes are addressed equally often during measured value acquisition, that is that the same number of measured values fall into each input variable class. This assumption applies to all further considerations of counter arrays. In the case of FIG. 5b, 1500 counting values for each input variable class are to fall into the control-manipulated variable class II and 500 counting values into class III. This leads to normal distributions with the maximum and the concentration at about 4%. In the evaluation of the normal distribution, the x axis thus does not serve for class division but in this case constantly indicates the manipulated variable deviation in percent.

The case of the example according to FIGS. 5a and b means, for example, the following in practice. Let the input variable be the air mass actually flowing through an air mass meter and the output variable be at the counter value for fixing the injection time. If the counter values for the same air masses drop by 4%, this means that 4% too little fuel is metered to the air mass actually taken in. This can be compensated by the precontrolled value being multiplied by the control factor, that is by the control-manipulated value 1.04. For compensating the output values which have dropped by 4%, consequently a control-manipulated variable which has increased by 4% is necessary, which can be read off directly from FIG. 5b.

Figure 6A:
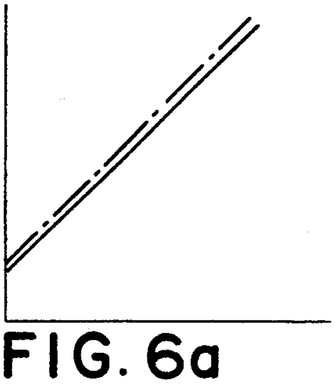
Figure 6B:
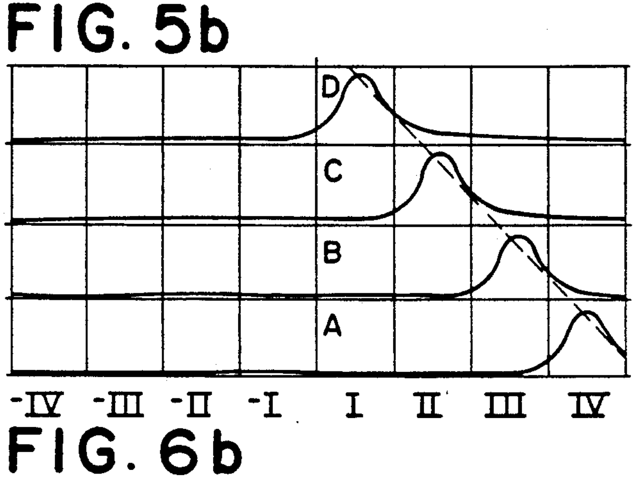

In the case of FIG. 6a, it is assumed that there is a parallel shift downwards by about the value 0.2 with respect to the non-aged characteristic of FIG. 3. This deviation means a varyingly large percental deviation for different values of the output variable, and consequently also different values of the input variable. For instance, the deviation in the lowest input variable class A is on average about 7.5%, while in the highest input variable class it is only about 2%. Consequently, the maxima and the concentrations of the normal distributions of the counter readings in the various input variable classes are no longer in one and the same control-manipulated variable class, instead the maxima and concentration for the input variable classes A, B, C and D lie in the control-manipulated variable classes IV, III, II and I, respectively.

Figure 7A:
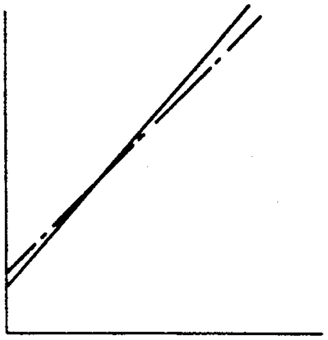
Figure 7B:
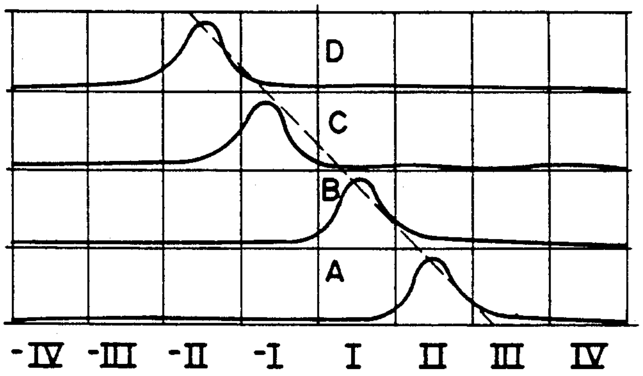

In FIG. 7a, a characteristic is represented which shows, on account of aging effects, both a constant and a proportional deviation with respect to the initial characteristic of FIG. 3, namely a shift downwards by about 2 units as in the case of FIG. 6a and a proportional increase of 4%. In this case, the maximum concentrations of the normal distributions of the counter values for the four input variable classes A, B, C, D lie in the control-manipulated variable classes IV, III, II and I, respectively.

Figure 8A:
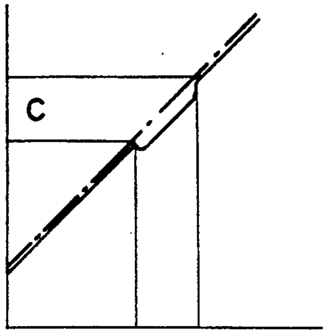
Figure 8B:
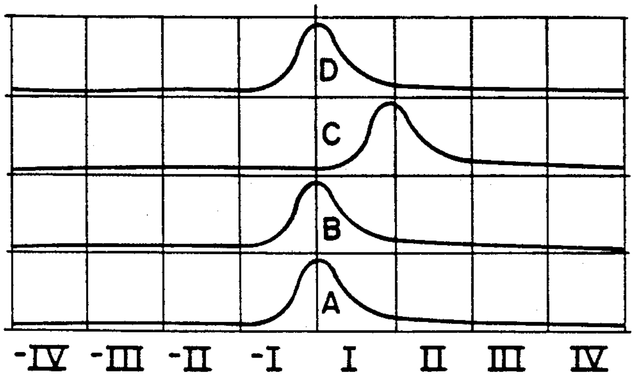

A further variant of an error caused by aging in the current characteristic in comparison with the original characteristic of FIG. 3 is represented in FIG. 8a. In the input variable range between 50 and 75 units, the values of the output variable lie 0.15 output variable units below the originally measured values. There is no error in the control-manipulated variable classes A, B and D. This has the consequence that, for the deviation classes in which no aging has taken place, the maxima and concentrations of the normal distributions of the counter readings lie unchanged at the manipulated variable deviation 0%. For the input variable class C, on the other hand, the maximum and the concentration lie at the manipulated variable deviation 2.5%, that is they are offset precisely by one control-manipulated variable class width with respect to the values of the unchanged input variable classes.

It becomes clear from FIGS. 5 to 8 that different aging effects manifest themselves differently, namely percental effects by a parallel shift of the maxima and concentrations of the normal distributions for all input variable classes, a constant additive error by a shift which becomes increasingly smaller with an increasing input value, and a range-dependent error by a shift of maximum and concentration merely for the input variable class which is affected by the error.

Figure 9:
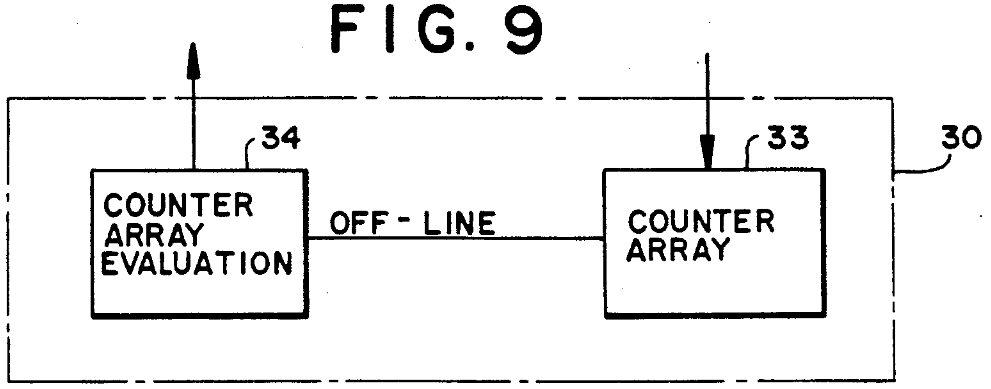
FIG. 9 shows a block circuit diagram of a means for manipulated variable processing with counter array and counter array evaluation.

The relationships just mentioned between changes in a characteristic caused by aging and observed shifts of the normal distributions of counter readings in the counter array may be conversely used to compensate for the errors caused by aging by evaluating the counter array. This is diagrammatically shown in FIG. 9, which shows the subdivided circuit diagram of a control-manipulated variable processor 30 (compare FIG. 2). A counter array 33 and a counter array evaluation 34 are present.

The counter array evaluation is performed off-line, that is not in response to every incrementing of an error status in the counter array 33. The evaluation may be performed, for example, after each elapsing of a fixed period of time, after reaching a total number of counter incrementations or after taking the controlled system 20 out of operation. Which measure is the most appropriate for initiating the counter array evaluation depends on the application. In the case of a pump which is operated without interruption and without frequent transient states, it is appropriate to evaluate after each elapsing of a given period of time. If, on the other hand, transient states occur often, it may be more appropriate to wait for the reaching of a total incrementation time. In the case of controlled systems which are only operated over periods of time which are short in comparison with aging times, such as in the case of an internal combustion engine installed in a motor vehicle, it is of particular advantage to always carry out the evaluation directly after switching off the internal combustion engine. It can then be handled with great care by the on-board computer, without having adverse effects on measures currently to be controlled by the computer.

Various evaluation possibilities are now explained with reference to FIGS. 10*a, b* to 13*a, b.*

In the characteristic according to FIG. 10*a*, the errors explained with reference to the characteristics of FIGS. *7a* and *8a* are combined The current characteristic therefore runs more steeply than the original characteristic, but is offset downwardly with respect to the latter and has in the input variable class C smaller values for that range. Correspondingly, FIG. 10*b* represents an overlay of the counter arrays according to FIGS. *7b* and *8b*.

Let first the additive error be corrected, by establishing by how many control deviation percentage points the concentration of the normal distribution of the lowest input variable class A has been shifted with respect to the concentration of the normal distribution at the greatest input variable class D, influenced least by the additive error. The normal distribution of the lowest input variable class A is shifted by the established amount below the normal distribution of the uppermost input variable class D, so that then the two concentrations and maxima lie in the same control-manipulated variable class, in the case of the example in the control-manipulated variable class -II. At the same time, it is computed which additive correction value for the precontrol corresponds to the shift carried out.

Figure 12A:
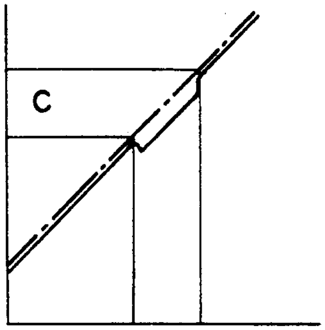
Figure 12B:
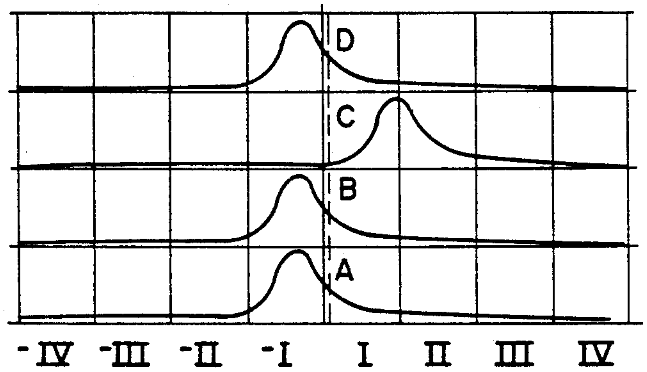
Figure 13A:
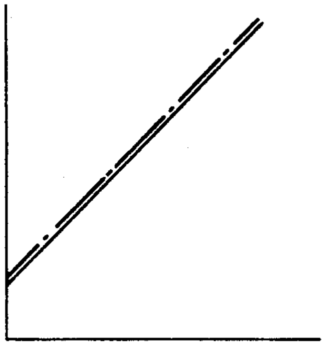
Figure 13B:
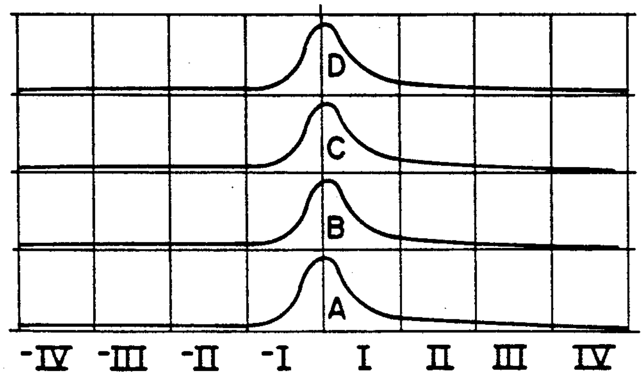

In the next example, shown in FIG. 12, the slope of the characteristic, that is the multiplicative error, is corrected. According to FIG. 12*b*, this is performed by averaging the concentrations of all the normal distributions with respect to the line of the manipulated variable deviation 0. The concentrations of the normal distributions in the input variable classes A, B and D then lie at about −0.8% and the concentration of the normal distribution in the input variable class C lies at about 2.5%. It is established by how many manipulated variable deviation percentage points the average value of the concentrations has been shifted; in the case of the example, this is about 2.5% from negative to positive control-manipulated variable deviations. A corresponding additive correction value is output, for example 1.025, if the correction value was previously 1, or 1.128 ($1.1 \times 1.025$) if the multiplicative correction value was previously already 1.1.

What remains after the general additive and multiplicative correction are shifts which are caused by the error of the input variable class C. These errors are corrected individually for the input variable classes, by an additive value or a multiplicative value. Which value is more appropriate depends on the overall sequence of the process.

When explaining FIGS. 3 to 13, it was assumed that the characteristics mentioned represent the relationship between the input variable and the output variable of a means for the conversion of values. In this case, both the input variable, which has previously been used as a reference in this context, and the output variable can be used for the class division of influencing variable classes. If, on the other hand, input variable and output variable represent variables such as those which occur at a measuring device, values of the input variable are not directly accessible, instead values of the input variable are determined from values of the output variable, which is after all the point of measuring. If, for example, the air mass ML is measured, input variable is the air mass ML and output variable for further processing is the output voltage U of the air mass sensor. The influencing variable classes are then output variable classes instead of input variable classes, as assumed up until now for the explanation.

The evaluation process described above is now described with reference to FIG. 14 in an overall view with a process for the precontrolling and feedback controlling of the lambda value of the air/fuel mixture fed to an internal combustion engine 35. A voltage U is supplied by an air mass sensor 36, and the voltage U is converted into a counting value Z, which is used for the computation of the injection time, within which an injection valve 37 is to be open. The counting value Z is divided in a dividing step 38 by the speed n of the internal combustion engine 35 and normalized in a normalizing step 39 by multiplication with a constant factor. In a slope correction step 40, a multiplication then follows with a global adaptation factor FG. In a shift correction step 41, a global adaptation summand SG is added. Range-dependent corrections are performed in a structure correction step 42 by multiplication with range-dependent correction factors FA, FB, FC or FD. An adapted precontrolled value is thereby formed. This adapted precontrolled value is linked multiplicatively with a control factor FR at a manipulated variable combination point 25, as a result of which finally the manipulated value supplied to the injection valve 37 is formed.

Let us assume that the manipulated value mentioned has precisely the correct magnitude for the lambda value 1 to occur on account of the supplied air and the injected quantity of fuel. This is reported by a lambda probe 43 to a comparison point 22, which subtracts the lambda actual value obtained from a lambda set value and feeds the resulting system deviation, in the assumed case the system deviation 0, to a control device 23. It is pointed out that, in practical application, the control device is not realized by a separate apparatus but by computing steps of a program. The control device 23 outputs the control factor FR as control-manipulated value. Since the system deviation is "0", the control factor is "1". The control factor FR is not only fed to the manipulated value combination point 25, but also to a steady-state condition filter 29, both as value to be passed and as decision value. Another decision value is the output voltage U of the air mass sensor 36. If both the control factor FR and the voltage U have only rates of change below given threshold values, the steady-state condition filter 29 allows the control factor FR established in each computing cycle to pass on to a counter array 33, which is divided according to control factor deviation classes as control-manipulated variable classes and according to voltage classes as influencing variable classes. In this array, an entry is then made, such as for example that of FIG. 4, since it has been assumed that no manipulated variable deviations should occur. A counter array evaluation 34 accordingly results in the global adaptation factor FG retaining the value 1 and the global adaptation summand SG retaining the value 0, both values which leave the precontrolled value unchanged. Correspondingly, the range factors FA, FB, FC and FD are output unchanged as "1".

Figure 10A:
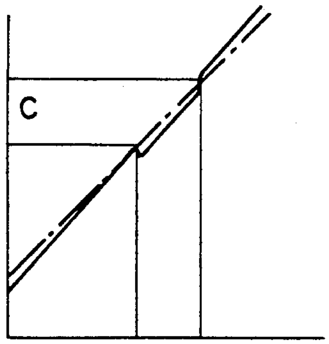
FIGS. 10*a, b* to 13*a, b* show diagrams corresponding to those of FIG. 3 and FIG. 4 for explaining evaluation steps for the correcting of characteristic errors.
Figure 10B:
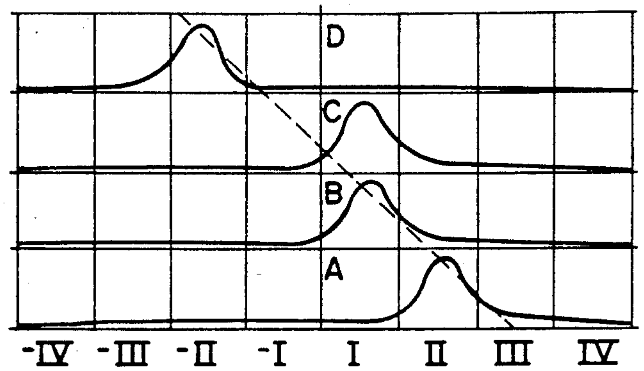

After some operating time, the air mass sensor 36 has aged to the extent that the relationship according to FIG. 3 no longer exists between the air mass ML actually flowing through it and the output voltage U, but the relationship according to FIG. 10*a*. For the various voltage classes, counter readings which lead to normal distributions according to FIG. 10*b* then occur during operation. If the internal combustion engine 35 is switched off, the counter array evaluation 34 begins to work, that is, it executes the correction steps described above. The counter array evaluation 34 establishes: a global adaptation summand SG (above explanation with reference to FIG. 12); a global adaptation factor FG (above explanation with reference to FIG. 11); and range factors FA, FB, FC and FD (above explanation with reference to FIG. 13). The new correction value is superposed on the old correction value, and the computing steps are represented in FIG. 14 by loops with sample/hold steps S/H 44. If the old global adaptation summand SG was, for example, 10 counter steps for the injection time calculation and accordingly the newly established global adaptations summand SG 5 counter steps, a global adaptation summand S of 15 is entered into the precontrolled value. The relationships for the global adaptation factor FG have already been explained above with reference to an example. The same applies correspondingly for the range factors FA–FD. In order to represent that each range factor has to be kept separately and multiplied by the value established in the evaluation to form the new factor, the instruction "4×S/H" is entered in the associated sample/hold step 44. Which of the four individual steps is triggered is fixed in a range determination step 45, which uses the sensor voltage U.

It is now to be explained with reference to FIG. 15 that the counter array 33 can also be configured more complex than previously explained. In the block circuit diagram according to FIG. 15 there is a precontrolled value memory 46, which is triggered by values of the speed n and of the accelerator pedal position FPS (or, equivalently, of the throttle valve angle) The precontrolled value is multiplicatively combined at a manipulated value combination point 25 with a control factor FR and the manipulated value thus computed is fed to an injection valve 37. The computing of the control factor FR is performed as explained above with reference to FIG. 14. In the block circuit diagram according to FIG. 15 there is no steady-state condition filter 29; control factors FR are array 33.n, which contains a plurality of individual counter arrays, which are divided according to accelerator pedal position classes and control factor deviation classes. Each of the arrays is assigned to a certain speed range. The counter array evaluation 34 determines correction values for each individual counter array for each accelerator pedal position class. With these correction values, the values of the accelerator pedal position FPS are multiplicatively corrected in a position correction step 47. The correction value which is supplied is fixed in a selection step 48 in dependence on the currently relevant accelerator pedal position class and speed class.

In this arrangement, it is assumed that each accelerator pedal position and each speed is assigned a certain air mass. When setting up the values of the precontrolled value memory 46, that is in calibration, precontrolled values were established which led to the control factor 1 for the respective speed and accelerator pedal position. If the accelerator pedal position sensor ages, that is it supplies after a certain operating time different signals with the same considered actual accelerator pedal position, the addressing of the precontrolled value memory 46 is performed incorrectly. In order for this addressing to continue to be performed correctly as before, the addressing value of the accelerator pedal position FPS is already corrected. However, it would also be possible to compute, in the counter array evaluation 34, correction values for the values supplied by the precontrolled value memory 46. It is more advantageous, however, always to correct the error at that point at which it is caused.

It should be pointed out in this context that, in the actual operation of a controlled system, for example an internal combustion engine 35, normally such simple conditions are not present as have been assumed to facilitate the description up to now. As already explained above, deviations of the control-manipulated value from that value which is assigned to the system deviation 0 can be caused not only by aging effects which relate to a single variable for determining the precontrolled value, but several aging effects can be superposed one on the other and, in addition, disturbances may act, as already explained above with reference to FIG. 2. If it is to be assumed that control-manipulated value deviations are caused by several effects, it is recommendable to perform a correction not on an influencing variable, such as on the accelerator pedal position in the process according to FIG. 15, but to arrange for the correction not to occur until one of the final steps for determining the precontrolled value. However, not only the suitable correction point depends on the overall characteristics of the system, but also the best-suited evaluation process. If it is to be assumed that disturbing effects are predominantly multiplicatively acting effects, the evaluation will concentrate mainly on the most accurate possible determination of a factor from the normal distributions. If, on the other hand, it is to be assumed in the case of a different system that aging effects or else uncompensated disturbances predominantly act additively, the objective will be to attain a state corresponding to that of FIG. 13*b* by as many additive correction components as possible. Also depending on the type of the overall system is whether a steady-state condition filter is expediently used or not, according to what sort of conditions such a filter works, and how control-manipulated values are to be evaluated. When using a continuous-action control device 23, it will be possible, for example, to take on every control-manipulated variable without further processing. In the case of a two-step controller, on the other hand, it is so that the control-manipulated values continuously oscillate about n average value. Then one uses either this average value or else the jump destinations which occur in the P step change with a PI control device. It is pointed out that, in the case of a two-step controller, "control-manipulated value which corresponds to the system deviation 0" is to be understood as an average value of the control-manipulated variable.

Up until now it has been assumed that an adaptation of the precontrolled value is performed only with the aid of the counter array evaluation 34. If, in an internal combustion engine this evaluation is not performed until the internal combustion engine is switched off, this would have the consequence that changes during operation cannot be adapted. This may concern extremely different effects. The injection valves may have been exchanged, refueling may have been carried out shortly before the last time the engine was switched off with a fuel having properties very different from those of the fuel when the tank was previously filled, or the air pressure may change greatly since the last operation or during driving, and the air density change caused thereby can not be taken into account due to the presence of only an air flow sensor instead of an air mass sensor. In order to bring about a fast adaptation in such cases and similar cases, it is expedient to use not only the off-line evaluation of a counter array 33 for adaptation but also to perform an on-line adaptation. Such a process is now explained with reference to FIG. 16.

Figure 16:
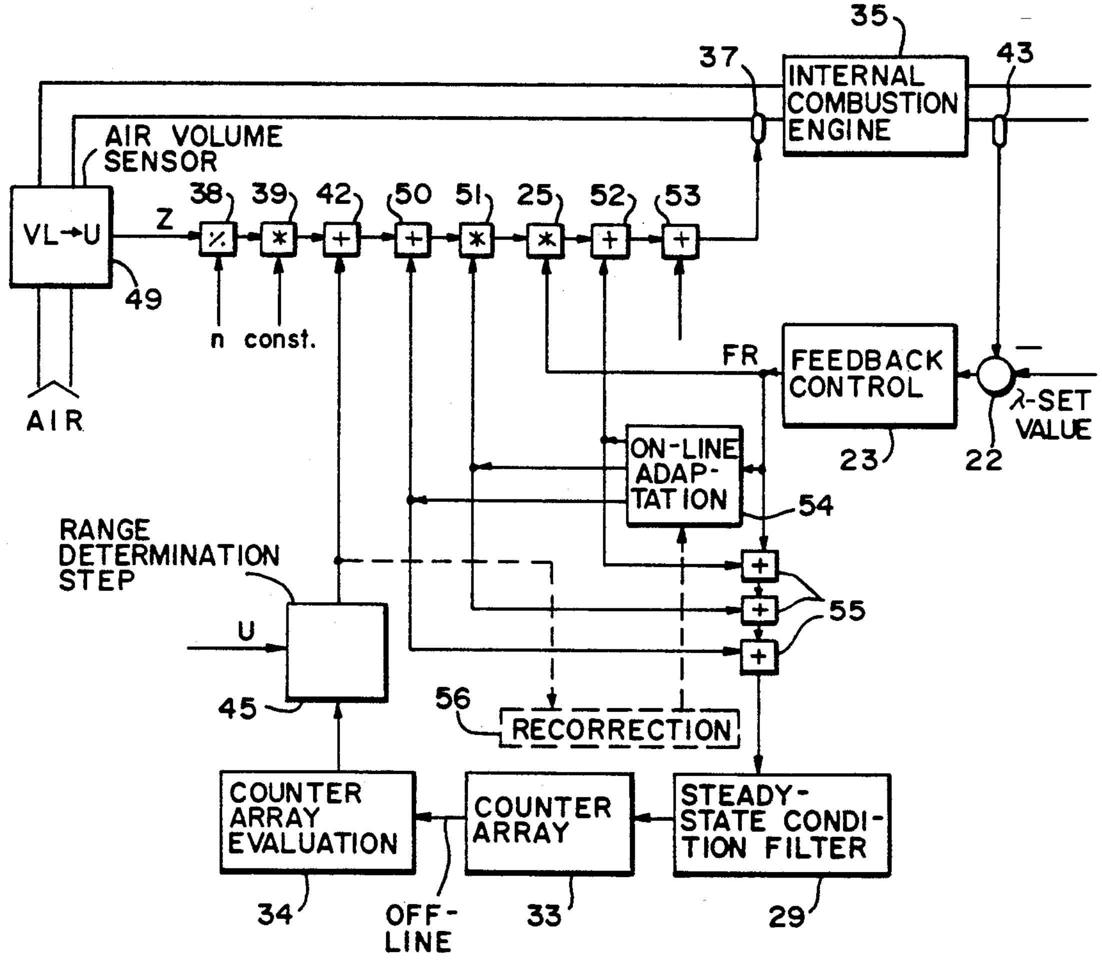
FIG. 16 shows a block circuit diagram of a control loop with on-line and off-line adaptation of the precontrol; and, FIGS. 17 and 18 each show a counter array diagram for explaining measures for improving the resolution of a counter array.

In the block circuit diagram according to FIG. 16, there is an air volume sensor 49, which outputs a voltage U in dependence on the volume flow VL flowing through it, which voltage leads to a counting value Z for calculating the injection time. This counting value Z is in turn, as already explained with reference to FIG. 14, divided in a dividing step 38 by the speed n and normalized in a normalizing step 39. This is followed by a structure correction step 42, as explained with reference to FIG. 14. There then follow a leakage air adaptation step 50, a multiplication adaptation step 51, the manipulated value combination step 25, already mentioned several times, an injection-additive correction step 52 and a battery voltage correction step 53. The latter will not be discussed in any more detail. By all of these steps, the manipulated value to be supplied to the injection valve 37 is formed. It is pointed out that in this case the manipulated value is not formed, as described in the previous cases, at the manipulated value combination point 25 from a precontrolled value and a control-manipulated variable, instead first a temporary precontrolled value is combined with a control-manipulated value, here again a control factor FR, whereupon the injection-additive correction step 52 and the likewise additive battery voltage correction step 53 follow. As already explained several times, the control factor is formed with the aid of a lambda probe 43, a comparison point 22 and a control device 23. The leakage air summand for the leakage air adaptation step 50, the compensation factor for the multiplication adaptation step 51 and the injection summand for the correction step 52 are formed in the usual way by a means 54 for on-line adaptation from the control factor FR. As already explained above with reference to FIG. 2, the adaptation has the effect that the control factor FR relatively quickly reaches that value which is assigned to the system deviation 0, that is the value 1 in the case of the control factor FR, even after abrupt changes of a disturbance, for example caused by the exchange of injection valves or by a significantly different air pressure upon renewed switching-on than upon the last switching-off. Slowly occurring aging effects do not act in a determinable way on the control factor FR, since they are continuously compensated by the fast on-line adaptation. Thus, during the course of time, a considerable error can occur in the signal supplied by a measuring device or a signal variable converter, without leading to a control factor FR which would indicate this deviation in a counter array 33. Only structural errors, that is measuring range-dependent errors, would still show up, since these cannot be compensated by the one set of on-line adaptation variables determined jointly for all ranges. However, here too, the measurement would not be very accurate, since the on-line adaptation responds immediately whenever a new measuring range is addressed in which a new structural error occurs, in order to compensate this error. For the precise determination of range-dependent errors, it is therefore more advantageous to proceed as follows.

Figure 17:
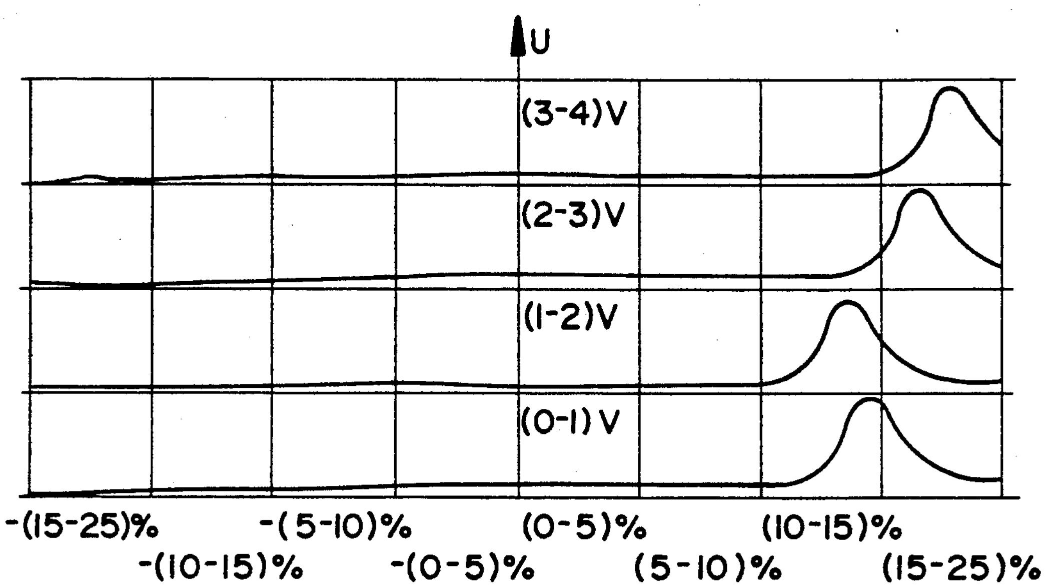

In three summation steps 55, the leakage air summand, the compensation factor and the injection summand are added to the control factor FR. Actually, the compensation factor should really undergo a multiplicative operation, but an additive operation leads to a negligible error, since as a rule the deviations from 1 are small. Forming summations has the advantage that the progress of the on-line adaptation does not have an effect in the summed value; rather, the sum is caused alone by the values of variables acting at the respective operating point which differ from values of this variable at the same operating point at the time of calibration. For the counter array, this produces, as an example, the distribution represented in FIG. 17. Again, there are four control-manipulated variable classes for positive and negative deviations with numerical ranges of 0–5, 5–10, 10–15 and 15–25%. Three voltage value classes as influencing variable classes exist, namely for 0–1, 1–2 and 2–3 voltage units. The maxima and concentrations of the specific normal distributions of the counter readings lie in the deviation class for control-manipulated variable deviations of 10–15% and in the next-higher class, that is the class for deviations of 15–25%. 25% corresponds to the typical stroke of a control device 23 for an internal combustion engine 35.

Figure 11A:
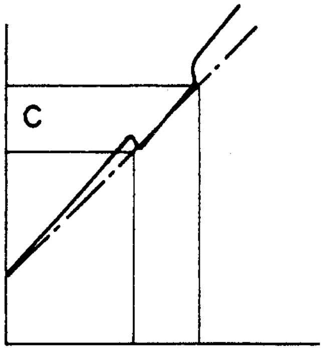
Figure 11B:
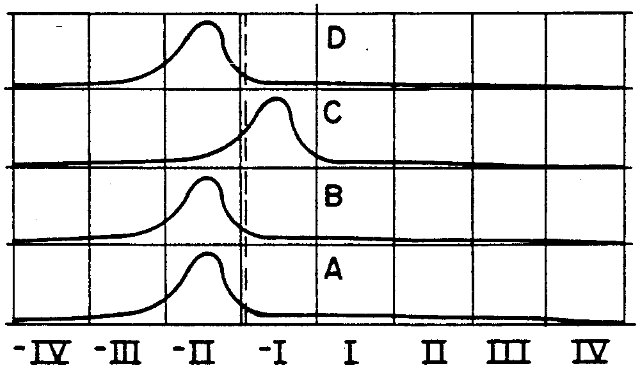

For the evaluation, the normal distributions are shifted correspondingly, taking into account possible additive and multiplicative errors, as explained with reference to FIGS. 11 and 12. There then remain the range-dependent errors according to FIG. 12, which in the case of FIG. 16 are incorporated in the determination of the precontrolled value by range-dependent summands in the structure correction step 42. Which range correction summand is passed on by a counter array evaluation 34 is determined in a range determination step 45, which checks which voltage range happens to exist in each case.

In FIG. 16, a recorrection step 56 is also drawn in, with broken lines, the performance of which may be of advantage under special conditions. It must be noted that, during the standstill of the internal combustion engine 35, new range correction values are determined for the structure correction step 42 by the counter array evaluation 34. This has the effect of supplying a different precontrolled value for a certain operating state when the internal combustion engine is switched on than was used shortly before switching off with correctly performed adaptation. Consequently, an overall incorrectly adapted value is produced, which has to be compensated again by the on-line adaptation 54. If, on the other hand, for example the leakage air summand is reduced by the recorrection step 56 precisely by that by which the range correction value is increased, or vice versa, the overall effect of the adaptation remains unchanged. However, this recorrection is only appropriate if a common recorrection value can be found for all ranges, which value leads to an improvement of the precontrol after incorporation into a value of the on-line adaptation which does not distinguish according to ranges. The extent to which this is possible depends on the overall setup of the particular system.

Figure 18:
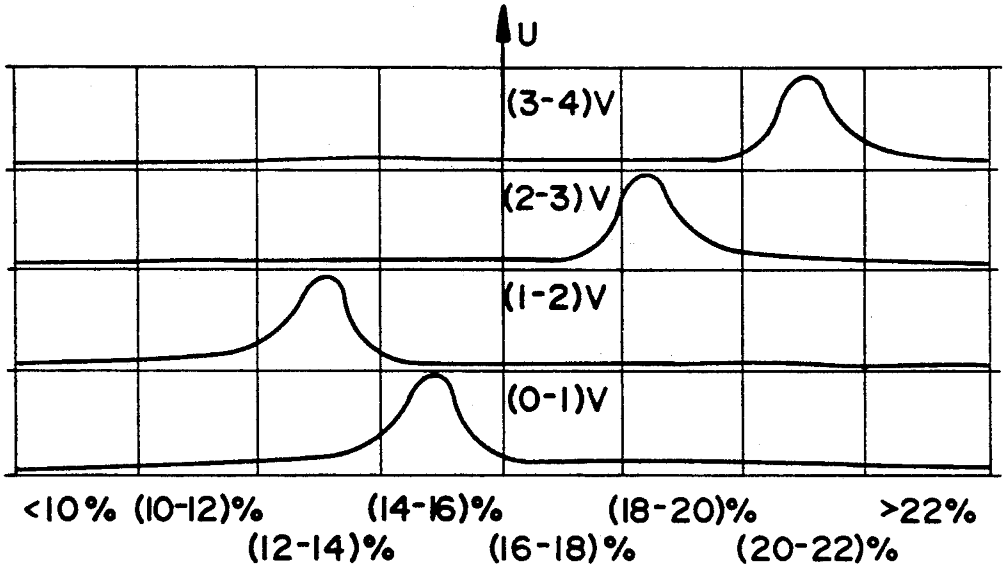

An advantageous variant of the class division of a counter array 33 is represented in FIG. 18. The division performed is based on the observation of FIG. 17, that the maxima and concentrations of the normal distributions are shifted relatively strongly for all influencing variable classes, but are close together in the range between about 10% and 25% deviation. The class division of the manipulated variable deviations is therefore no longer performed between −25 and +25%, but only between +10 and 25%, although as before into eight classes. In this way, range differences with considerably improved resolution can be established. However, it is of advantage to use the two outermost classes as broad collective classes. Thus, the control-manipulated variable class on the extreme left covers all values between −25 and +10% deviation and the class on the extreme right covers all values greater than 22%.

If the fine division in the next evaluation reveals that, on account of improved range adaptation, the maxima and concentrations only lie, for example, between 14 and 18%, the division of the counter array for value detection in the next operating cycle is advantageously made even finer, such that again there are two large marginal classes and six classes in between with just half a percent width.

In the case of the illustrative embodiments so far, eight control-manipulated variable classes and four influencing variable classes were assumed. The selection of these numbers of classes was made for reasons of clarity of the illustration. In practice, preferably a higher number of influencing variable classes will be chosen, in order to make possible as finely divided a structural adaptation as possible, that is the adaptation is divided range by range.

We claim:

1. A method for precontrolling and controlling a controlled variable of a controlled system, in which at least one influencing variable is measured and, depending on the measuring result, a value of a precontrolled variable is supplied for precontrolling a manipulated variable, which was determined i advance in a calibration process under given conditions such that the effect of the influencing variable was compensated to a given extent, that is a given control-manipulated value occurred, preferably the control-manipulated value associated wit the system deviation 0, the method comprising the steps of:

subdividing the influencing variable according to value into influencing variable classes;

subdividing a variable dependent on the control-manipulated variable according to value into control-manipulated variable classes;

repeatedly determining in which control-manipulated variable class the control-manipulated value happens to lie and in which influencing variable class the value of the influencing variable happens to lie;

incrementing a counter in a cell which is part of a counter array, the cells of which can be addressed by numbers of the two classes;

after occurrence of an evaluation condition, evaluating the counter array to the effect that the distribution over the control-manipulated variable classes is established for each influencing variable class;

whenever the distribution concentrations for different influencing variable classes lie in different control-manipulated variable classes, computing a correction value for the particular influencing variable class; and, during operation of the controlled system, influencing the manipulated variables by the associated correction value, account being taken of the relevant influencing variable class, the correction values being determined by the evaluation such that the distribution concentrations should lie in the same control-manipulated variable class for all the influencing variable classes.

2. The method of claim 1, wherein, in addition, an on-line adaptation is carried out by evaluating control manipulated values, in which adaptation the overall effect of adaptation values and control-manipulated values remains essentially constant, and in that in this case the sum values of adaptation values and control-manipulated values are subdivided into control-manipulated variable classes.

3. The method of claim 1, wherein the correction values are dimensioned such that the distribution concentrations for all the influencing variable classes are to lie at the same control-manipulated value, which is associated with the system deviation 0.

4. The method of claim 1, wherein the evaluation condition is the elapse of a given period of time.

5. The method of claim 1, wherein the evaluation condition is the reaching of a given number of counter incrementations.

6. The method of claim 1, wherein the evaluation condition is the switching-off of the controlled system.

7. The method of claim 1, wherein all the counter values of the counter array are set to 0 after the evaluation.

8. The method of claim 1, wherein the manipulated values are influenced by correcting the values of the influencing variable before a conversion.

9. The method of claim 1, wherein the manipulated values are influenced by correcting the values of the influencing variable after a conversion.

10. The method of claim 1, wherein the manipulated values are influenced independently of the relevant influencing variable class by an additive correction sub-value common to all influencing variable classes.

11. The method of claim 1, wherein the manipulated values are influenced independently of the relevant influencing variable class by a multiplicative correction component value common to all influencing variable classes.

12. The method of claim 1, wherein the method is applied to an internal combustion engine to which an air/fuel mixture having a lambda value is supplied; and, the controlled variable is the lambda value of the air/fuel mixture supplied to the internal combustion engine, the influencing variable is an airflow-indicating variable and the precontrolled variable is a fuel-metering variable.

13. Apparatus for carrying out a method for precontrolling and controlling a controlled variable, in which at least one influencing variable is measured and, depending on the measurement result, a value of a precontrolled variable is supplied for precontrolling a manipulated variable, which was determined in advance in a calibration process under given conditions such that the effect of the influencing variable on the controlled system was compensated to a given extent, that is a given control-manipulated value occurred, preferably the control-manipulated value associated with the system deviation 0, the apparatus comprising:

a counter array which is subdivided into influencing variable classes and control-manipulated variable classes orthogonal thereto, whereby a number of cells are produced, which can be addressed by numbers of the two classes;

means for repeatedly determining, during the operation of the controlled system, in which control-manipulated variable class the control-manipulated value happens to lie and in which influencing variable class the value of the influencing variable happens to lie and for incrementing a counter in the associated cell; and, evaluating means for evaluating said counter array after arrival of an evaluation condition, said evaluating means determining the distribution over the control-manipulated variable class for each influencing variable class and, whenever the distribution concentrations for different influencing variable classes lie in different control-manipulated variable classes, computing a correction value for the respective influencing variable class and, during the operation of the controlled system, influencing the manipulated values by the particular correction value, taking into account the relevant influencing variable class, the correction values being determined by said evaluating means such that the distribution concentrations should lie in the same control-manipulated variable class for all the influencing variable classes.

14. The apparatus of claim 13, further comprising means for carrying out an on-line adaptation.

* * * * *

UNITED STATES PATENT AND TRADEMARK OFFICE

CERTIFICATE OF CORRECTION

PATENT NO. : 5,079,691
DATED : January 7, 1992
INVENTOR(S) : Klaus Heck, Günther Plapp and Jürgen Kurle It is certified that error appears in the above-identified patent and that said Letters Patent is hereby corrected as shown below:

In the title page, under numeral [21]: delete "459,735" and substitute -- 459,755 -- therefor.

In column 5, line 35: delete "means 3" and substitute -- means 31 -- therefor.

In column 11, line 7: between "combined" and "The" insert -- . --.

In column 13, line 36: between "angle)" and "The" insert -- . --.

In column 13, line 44: between "are" and "array" insert -- consequently entered without filtering into a counter --.

In column 14, line 48: delete "n" and substitute -- an -- therefor.

UNITED STATES PATENT AND TRADEMARK OFFICE

CERTIFICATE OF CORRECTION

PATENT NO. : 5,079,691

DATED : January 7, 1992

INVENTOR(S) : Klaus Heck, Günther Plapp and Jürgen Kurle

It is certified that error appears in the above-identified patent and that said Letters Patent is hereby corrected as shown below:

In column 17, line 32: delete "i" and substitute -- in -- therefor.

In column 17, line 38: delete "wit" and substitute -- with -- therefor.

Signed and Sealed this

Seventh Day of September, 1993

Attest:

BRUCE LEHMAN

Attesting Officer

Commissioner of Patents and Trademarks